(12) United States Patent
Bashir et al.

(10) Patent No.: US 8,349,422 B2
(45) Date of Patent: *Jan. 8, 2013

(54) FLEXIBLE INTERMEDIATE BULK CONTAINER

(75) Inventors: Zahir Bashir, Riyadh (SA); Ian Macmillan Ward, Leeds (GB); Glen Peter Thompson, Bradford (GB); Anthony Paul Unwin, Leeds (GB)

(73) Assignee: Saudi Basic Industries Corporation, Riyadh (SA)

( * ) Notice: Subject to any disclaimer, the term of this patent is extended or adjusted under 35 U.S.C. 154(b) by 94 days.

This patent is subject to a terminal disclaimer.

(21) Appl. No.: 12/988,757

(22) PCT Filed: Apr. 20, 2009

(86) PCT No.: PCT/EP2009/002985
§ 371 (c)(1),
(2), (4) Date: Dec. 20, 2010

(87) PCT Pub. No.: WO2009/130032
PCT Pub. Date: Oct. 29, 2009

(65) Prior Publication Data
US 2011/0135221 A1 Jun. 9, 2011

(30) Foreign Application Priority Data

Apr. 24, 2008 (EP) .................................. 08007918

(51) Int. Cl.
*B29D 22/00* (2006.01)
(52) U.S. Cl. ...................... 428/36.1; 383/6; 264/173.15
(58) Field of Classification Search ................. 428/36.1; 383/6; 264/173.15
See application file for complete search history.

(56) References Cited

U.S. PATENT DOCUMENTS

| | | | |
|---|---|---|---|
| 3,640,944 | A | 2/1972 | Seppala et al. |
| 3,843,761 | A | 10/1974 | Bierenbaum et al. |
| 3,944,699 | A | 3/1976 | Mathews et al. |
| 4,116,892 | A | 9/1978 | Schwarz |
| 4,764,320 | A | 8/1988 | Chau et al. |
| 4,780,402 | A | 10/1988 | Remmington |

(Continued)

FOREIGN PATENT DOCUMENTS

DE 102005058908 A1 6/2007

(Continued)

OTHER PUBLICATIONS

Chandran, Prashant et al,; Biaxial Orientation of Poly(ethylene Terephthalate);Adv Polymer Tech, vol. 12, No. 2, 133-151 (1993).

(Continued)

*Primary Examiner* — N. Edwards
(74) *Attorney, Agent, or Firm* — Cantor Colburn LLP

(57) ABSTRACT

The invention relates to a Flexible Intermediate Bulk Container (FIBC) having a body made of flexible woven fabric, and integral handling devices, wherein the fabric is woven from opaque oriented polyethylene terephthalate (PET) strips having a density of from 500 to 1300 kg/m³ and a tensile strength of at least 250 MPa.

Advantages of said FIBC include directly printability with the usual type of inks, giving excellent contrast and good adhesion, without pre-treatment like a corona- or flame-treatment. The FIBC based on the PET fabric also shows higher gloss; better UV resistance; better mechanical properties, like high tensile strength and creep resistance; favorable abrasion resistance; and higher temperature resistance than a conventional big bag based on polypropylene strips.

The invention further relates to such a FIBC based on stress-whitened PET tapes obtained by a special drawing process.

11 Claims, 2 Drawing Sheets

U.S. PATENT DOCUMENTS

| | | | |
|---|---|---|---|
| 5,422,175 | A | 6/1995 | Ito et al. |
| 5,514,460 | A | 5/1996 | Surman et al. |
| 6,124,029 | A | 9/2000 | Schreck et al. |
| 6,641,924 | B1 | 11/2003 | Peiffer et al. |
| 6,855,400 | B1 | 2/2005 | Andreis et al. |
| 6,939,600 | B2 | 9/2005 | Murschall et al. |
| 7,238,419 | B2 | 7/2007 | Kern et al. |
| 2003/0017317 | A1 | 1/2003 | Murschall et al. |
| 2004/0026827 | A1 | 2/2004 | Dairanieh et al. |
| 2004/0058604 | A1 | 3/2004 | Jud et al. |
| 2005/0112296 | A1 | 5/2005 | Laney et al. |
| 2006/0073318 | A1 | 4/2006 | Tuttle et al. |
| 2008/0251181 | A1 | 10/2008 | Quintens et al. |
| 2011/0097524 | A1 | 4/2011 | Bashir et al. |
| 2011/0135221 | A1* | 6/2011 | Bashir et al. ............... 383/6 |
| 2012/0107527 | A1* | 5/2012 | Auffermann ............ 428/17 |

FOREIGN PATENT DOCUMENTS

| | | |
|---|---|---|
| EP | 0300060 A1 | 1/1989 |
| EP | 0451797 A2 | 10/1991 |
| EP | 0496323 A2 | 7/1992 |
| EP | 0924050 A2 | 6/1999 |
| EP | 1279755 A2 | 1/2003 |
| EP | 1627894 A1 | 2/2006 |
| GB | 609797 A | 10/1948 |
| GB | 1307177 A | 2/1973 |
| GB | 1521579 | 8/1978 |
| GB | 1591091 A | 6/1981 |
| GB | 1602726 | 11/1981 |
| JP | 64020312 A | 1/1989 |
| JP | 07310231 A | 11/1995 |
| WO | 2008040670 A1 | 4/2008 |

OTHER PUBLICATIONS

Oisson, David L., et al; Packaging, Containers for Industrial Materials; Kirk-Othmer Encyclopedia of Chemical Tech.; Published Jun. 17, 2005.
Japanese Patent No. 07310231 (A); Publication Date: Nov. 28, 1995; Abstract Only; 1 Page.
Japanese Patent No. 64020310 (A); Publication Date: Jan. 24, 1983; Abstract Only; 1 Page.
Extended European Search Report; European Patent No. 08007918.9; Date of Mailing: Nov. 11, 2008; 4 Pages.
International Search Report; International Application No. PCT/EP2009/002985; International Filing Date: Apr. 20, 2009; Date of Mailing: Aug. 13, 2009; 3 Pages.
Written Opinion of the International Searching Authority; International Application No. PCT/EP2009/002985; International Filing Date: Apr. 20, 2009; Date of Mailing: Aug. 13, 2009; 5 Pages.
Bashir et al.; "Evaluation of Three Methods for the Measurement of Crystallinity of Pet Resins, Performs, and Bottles"; Polymer Engineering and Science; vol. 40, No. 11; Nov. 2000; pp. 2442-2455.
De et al.; "The Crystal Structure of Polyethylene Terephthalate"; Proceedings of the Royal Society of London; Series A: Mathematical and Physical Sciences; vol. 226; Dec. 7, 1954; 13 Pages.
Fakirov et al.; "Unit Cell Dimensions of Poly(ethylene terephthalate)"; Die Makromolekulare Chemie; vol. 176; 1975; 8 Pages.
Jabarin; "Optical Properties of Thermally Crystallized Poly(ethylene terephthalate)"; Polymer Engineering and Science; vol. 22, No. 13; Sep. 1982; 8 Pages.
Rule; Physical Constants of Poly(oxyethylene-oxyterephthaloyl) (Poly(ethylene terephthalate)); Polymer Handbook; Fourth Edition; Chapter 5; Published: John Wiley; Editors: J. Bandrup, E.M. Immergut, and E. A. Grulke; 1975; pp. 113-118.

* cited by examiner

FLEXIBLE INTERMEDIATE BULK CONTAINER

The present invention relates to a Flexible Intermediate Bulk Container (FIBC) having a body made of flexible fabric woven from polymeric strips, and integral handling devices.

Such a flexible intermediate bulk container is for example described in the Chapter "Packaging, Containers for Industrial Materials" in Kirk-Othmer Encyclopedia of Chemical Technology, John Wiley & Sons, Inc (2005); available via DOI: 10.1002/0471238961.0315142015121919.a01.pub2.

A FIBC is defined as an intermediate bulk container having a body made of flexible fabric. Such flexible containers cannot be handled manually when filled; are intended for shipment of solid material in powder, flake, or granular form; do not require further packaging; and are designed to be handled or lifted from the top by means of integral, permanently attached devices (like lift loops or straps).

A FIBC is also referred to as big bag, bulk bag, bulk sack or super sack. These bulk bags are used for dry, flowable products, with a typical capacity of from about 500-2000 kg. Examples of industries that use FIBCs include food, chemical, polymer, refractories, and agriculture. The flexible intermediate bulk container offers features that are unique to this package, as it can be folded flat and bailed for shipment to the user. It offers a low package-to-product weight ratio. The cost is competitive with other forms of packaging, and a FIBC usually can be used without pallets. They are easy to store and handle in warehouses with standard equipment, like fork-lifts or cranes, and are designed to fit two across in a truck or shipping container. Both standardized and customized bags meeting specific user requirements are being used. In addition, many countries require that FIBCs are certified by an independent laboratory to comply with performance standards.

FIBCs are generally provided with printings on the surface of the woven fabric, including company identifications and logos, but also information on bag properties or certifications, or on packaged product. When hazardous products are shipped in bulk bags, for example, the UN marking for the product must be printed on the container body.

FIBCs are nowadays predominantly made from woven flat polypropylene (PP) strips; such woven offers good mechanical strength at low weight, and is less complex and costly to make than a fabric made from PP multi-filament fibres. Also other fabrics made from different polymers have been proposed depending on necessary container strength and factors of safety.

Within the context of the present application a strip or tape is understood to mean an unsupported section of plastic material, whose thickness is very thin in relation to its length and width. The dimensions of a strip may vary widely, but usually thickness is in the range of from 5 to 2000 µm, and its width may vary from 0.5 mm to 50 mm. The length of a strip can be indefinite, as the strips are normally made with a continuous extrusion process. A strip can be ready-made to its width via extrusion, but making a multitude of tapes simultaneously would need multiple expensive dies or spinnerets and drawing/winding equipment; as in multi-filament fibre spinning technology. Therefore tapes are generally made on industrial scale by extruding a wider sheet or film, and subsequently splitting it into segments of desired width. A further advantage of this splitting technology is that tapes obtained have a well-controlled rectangular cross-section, which is desirable for uniform drawing behaviour.

A drawback of the known FIBC having a body made of flexible fabric woven from polypropylene strips is that printing typically requires a pre-treatment step of the polypropylene woven fabric, like a corona discharge treatment, to ensure proper adhesion of the printed matter. A further disadvantage of the known FIBC is that polypropylene is sensitive to UV degradation, meaning incorporation of relatively expensive stabilisers is required.

The object of the present invention is therefore to provide a FIBC that does not show said drawbacks of a woven from polypropylene strips, but which shows good printability with high contrast, while retaining strength properties.

This object is achieved according to the invention with a FIBC having a body made of flexible fabric, which is woven from opaque oriented polyethylene terephthalate (PET) strips having a density of from 500 to 1300 kg/m$^3$ and a tensile strength of at least 250 MPa.

Refer now to the figures.

Figure 1:
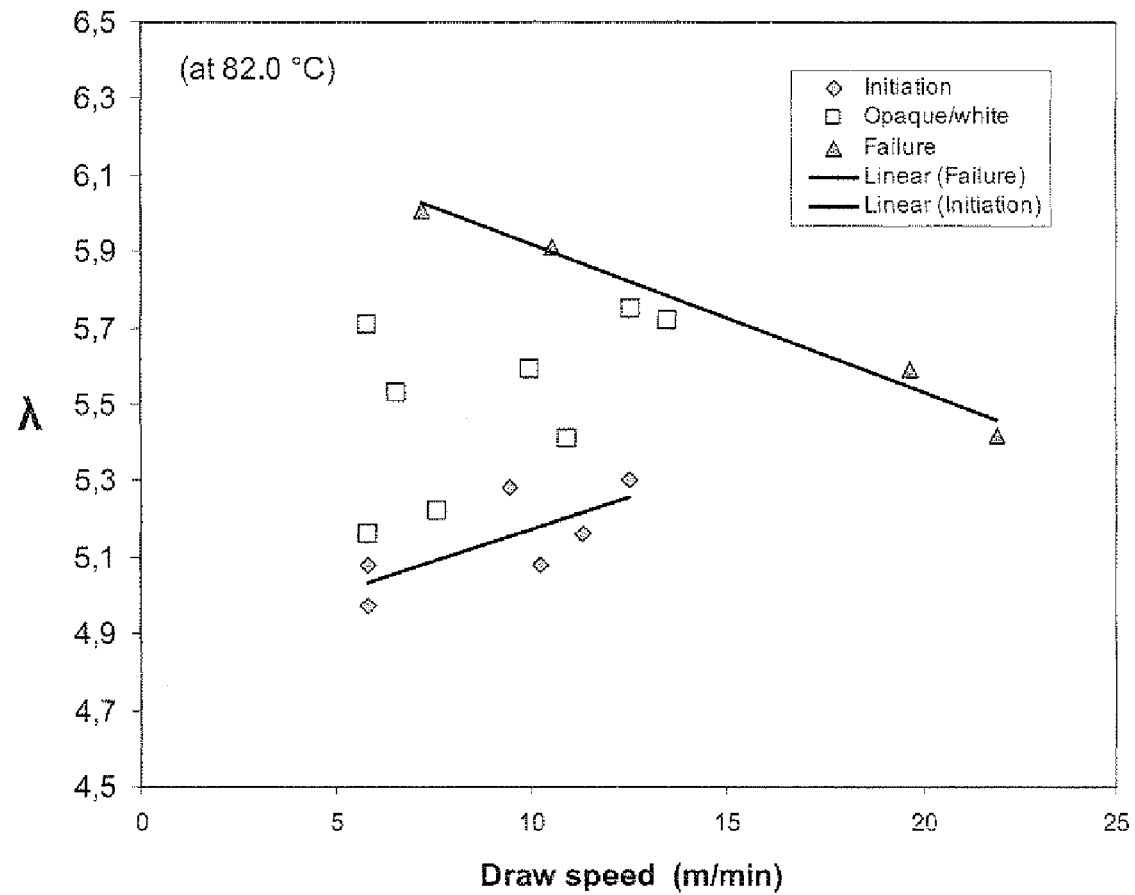
FIG. 1 is a graphical illustration of draw ratio ($\lambda$) versus draw speed showing draw ratios at which stress-whitening and film failure is observed for some examples.

The FIBC according to the invention containing a woven fabric made from said opaque PET strips can be directly printed with the usual type of inks, giving excellent contrast and good adhesion, without pre-treatment like a corona- or flame-treatment. The PET fabric also shows better UV resistance than PP. Further advantages of the big bag having a PET-based body include very good mechanical properties, like high tensile strength, but also favourable abrasion resistance, high temperature resistance, and high gloss. The PET-based big bag has significantly better creep performance than a PP big bag, also at temperatures up to 80° C., which allows for example hot filling with industrial goods, such as cement on a production line.

Within the context of the present invention polyethylene terephthalate is understood to mean a composition that substantially consists of at least one crystallisable thermoplastic polyester derived via polycondensation reaction from ethylene glycol, terephthalic acid, and optionally one or more other diols and/or dicarboxylic acids as comonomers, and customary additives. The composition may contain one or more conventional additives as known to a skilled person, like catalyst residues, stabilisers, such as heat-stabilisers, antioxidants, and light stabilisers; processing aids such as lubricants, anti-blocking agents, and anti-static agents; colorants, both pigments and dyes; and void-inducing additives like mineral particles or dispersed incompatible polymers. Generally, each of such additives can be used in an amount of some tenths of a percent up to several mass %. In a preferred embodiment of the invention the PET contains at most 10 mass % of customary additives, preferably at most about 5, 3, 2 or even 1 mass %.

The polyester being crystallisable means that the PET shows such crystallisation behaviour, that by rapidly cooling molten polymer from the melt to below the glass transition temperature ($T_g$), called quenching, a substantially amorphous product is obtained. Such (slowly) crystallising polyester should, on the other hand, be able to crystallise upon orienting the polymer chains during drawing or stretching the amorphous product, preferably at elevated temperatures, to result in a semi-crystalline oriented film or strip. The skilled person is able to select a PET homopolymer or copolymer, or mixtures thereof, which show the desired crystallisation behaviour. Preferably, such copolymers of PET contain at most about 15 mol % of one or more other dial and/or dicarboxylic acid, more preferably at most 10, 6 or 4 mol %. Suitable comonomers include aliphatic and aromatic diols, like 1,3-propane dial (or trimethylene glycol), 1,4-butane dial (or tetramethylene glycol); cycloaliphatic dials like 1,4-cyclohexanedimethanol; and diols that may also be formed during the polycondensation reaction like diethylene glycol. Suitable dicarboxylic acids include aromatic compounds like isophthalic acid, phthalic acid, naphthalene 2,6-dicarboxylic acid, and biphenyl 4,4'-dicarboxylic acid, but also aliphatic diacids like adipic acid and 1,4-cyclohexanedicarboxylic acid.

Suitable PET polymers have a molar mass that results in a melt viscosity allowing easy and stable extrusion, and which results in a desired level of mechanical properties of extruded products; as is known to a skilled person. Typically, an indication for the molar mass of thermoplastic polyesters is derived from measuring the viscosity of diluted solutions; for example expressed as intrinsic Viscosity (IV). Suitable PET has an IV in the range 0.5-2.5 dL/g. A certain minimum IV is needed for extrudability and higher IV generally results in better mechanical properties, but too high a viscosity may hamper processing behaviour. Thus, IV is preferably at least 0.55, 0.6 or even 0.65 dL/g, and at most 2.0, 1.8 or 1.6 dL/g.

The opaque oriented PET strip is not or hardly transparent to human sight, and has a white or whitish colour if made from a PET composition of natural colour; but optionally of different colour if the composition contains one or more colorants.

Opaque, whitened PET strips can be made in different ways, for example from a polyester composition containing some void-inducing additive. In U.S. Pat. No. 4,780,402 it is indicated that by using a specified amount of barium sulphate having specified particle size in a PET composition, a film can be obtained that shows improved opacity and a glossy surface; caused by voiding that occurs around the additive particles in the film upon drawing (also referred to as stretching).

A further way of making opaque polyester film by formation of fine voids in the film during stretching, is known from documents like EP 0496323 A2, U.S. Pat. No. 6,641,924 B1, and publications cited therein. In these documents first a PET composition is made, which contains a relatively high amount of finely dispersed particles of a polymer that is incompatible with the polyester. When an amorphous film made from such composition is subsequently stretched, a void is formed around each particle. Typical examples of polymers that are incompatible with polyesters include non-polar materials like polyolefins and polystyrenes. For example, in EP 0300060 A 3-40 mass % of polypropylene is added to PET; in EP 0496323 A2 a polyester composition containing typically 2-25 mass % of polymethyl pentene is used; and in U.S. Pat. No. 6,641,924 B1 5-60 mass % of a specific cycloolefin copolymer is applied to initiate void formation upon drawing a PET film.

The present inventors have found that an opaque oriented PET film can also be made without adding void-inducing particles that de-bond on drawing, by applying high-stress drawing conditions to amorphous PET. High stress conditions can be achieved by (1) low drawing temperature, (2) high draw ratio, (3) high strain rate, or by combinations thereof. The film thus produced will be termed stress-whitened, to distinct from whitened films made by void inducing additives, and from transparent oriented films made under conventional lower stress conditions (conventionally oriented PET).

Therefore, the invention also specifically relates to a FIBC wherein the opaque oriented PET strips have been made with a process comprising the steps of
a) extruding a composition substantially consisting of PET and at most 10 mass % of customary additives through a slot die, and quenching to form a substantially amorphous film having a crystallinity of at most 5%;
b) rapidly heating the amorphous film to a drawing temperature in the range from $T_g$ to $(T_g+50)°$ C. while applying a draw ratio in the range of from $\lambda_{initiation}$ to $\lambda_{max.}$ in longitudinal direction, and a drawing rate of at least 1 m/min to form an oriented film showing stress-whitening, wherein $\lambda_{initiation}$ is the draw ratio at which a transfer from a transparent product to a stress-whitened product occurs and $\lambda_{max.}$ is the draw ratio at which failure of the stress whitened film occurs;
c) heat-setting the oriented film;
d) optionally slitting the film into strips after step a), b) or c).

Advantages of the stress-whitened strips that are obtained with this process over other opaque or whitened PET strips include a high gloss surface, and the strips being substantially free of void-forming additives like high amounts of fine mineral particles or dispersed non-miscible polymer particles, which may reduce mechanical strength. The film further combines good mechanical properties with a relatively low density; making it cost competitive to PP tape on a mass basis, unlike conventionally made PET tapes.

The preferred process for making stress-whitened PET strips comprises a step of extruding the polyester composition through a slot die, and quenching to form a substantially amorphous film. Typically, a flat film die is used to extrude the polymer melt into a melt film that is then quenched into a solid film. The dimensions of the die are chosen such to give a desired thickness and width for the film after drawing. A certain minimum thickness is needed to give a stable and uniform film extrusion; preferably the thickness is at least about 10 μm, more preferably at least 20, 50 or 100 μm. The thickness of the molten film after leaving the die is such that quick and homogeneous cooling in the quenching step is possible, to give a homogeneous amorphous product, and may be as high as 10 mm. Quenching can be done using known methods; preferably the film is casted onto one or more cooled drum(s) or roller(s), which are preferably polished, to better control surface smoothness of the film. Optionally, electrostatic pinning of the film against the surface of roller is used. To enable quick and homogeneous cooling, the molten film has preferably a thickness of at most about 3 mm, more preferably at most 1000, 500, 250, or 150 μm.

The width of the die and molten film may vary widely, for example from 0.1 to 3000 mm. As the drawing process of the invention has a narrow processing window for stable operation, good dimensional control of the extruded film is also important. Considering that some thickness and width variations are frequently observed on the edges of an extruded film, it is preferred to trim off the edges of the film before drawing. Therefore, a width of at least about 1 mm is preferred; more preferably the width is at least 5, 10, 50 or 100 mm. For making strips, for example, that have a width of on the order of 0.5-50 mm, it is in this respect preferred to extrude a wider film, for example from 1 to 3 m wide, to trim the edges and then to slit the film into strips of desired width before or after drawing, or even after heat-setting.

It is found that to secure a stable drawing process the substantially amorphous film should have a crystallinity of at most 5%, as for example measured by the density method. Preferably the amorphous film has less than 3% crystallinity, more preferably less than 2 or 1%, and most preferably has no measurable crystallinity. An amorphous PET homopolyester film that has no measurable crystallinity will be highly transparent and typically a density of about 1335 kg/m³ and a haze of less than 2%.

In general, crystallinity of polyester films can be measured with different methods, including X-ray diffraction; haze and transparency measurement; Differential Scanning calorimetry (DSC); and density determination.

An X-ray photo of an amorphous PET film will show a halo with no distinct Bragg diffraction peaks, and is well known to those skilled in the art. If a one dimensional pattern (X-ray diffractogam) is recorded of the film, a very broad scattering between 2θ=10° to 35°, centred about 20° is found. Even if only 3% crystallisation has taken place, such a diffractogram will start to show sharper peaks superimposed on the amorphous scattering.

An amorphous PET sample when heated in a DSC apparatus at 10° C./min shows a step-like change in the heat capacity around 75° C. indicating the glass transition; an exothermic cold crystallisation peak at about 120-135° C., with an enthalpy of about 28-47 J/g; and an endothermic melting peak at about 255-260° C. with enthalpy of about 65 J/g (see Bashir et al., Polymer Engineering and Science, 40, 2442 (2000) for typical DSC curves of amorphous and semi-crystalline PET). If there is any crystallinity present in the film at the start, the $T_g$ becomes weaker, the cold crystallisation exotherm shifts to lower temperatures (that is moves closer to the Tg) and become less intense and the melting endotherm becomes sharper. The more amorphous the film, the stronger the $T_g$ and the higher the values of cold crystallisation enthalpy (more close to 47 J/g than 28 J/g).

While a semi-crystalline PET product may be transparent or opaque, an amorphous PET film will be transparent (unless containing opacifying additives). A further quantitative test to measure degree of crystallinity is measuring the haze of the amorphous film. Haze can originate from surface irregularities and from variations in refractive index in the bulk. Ignoring surface irregularities, the main cause for haze is spherulitic crystallisation of the polyester film, because amorphous and crystalline regions have different refractive indices. Generally, haze in PET increases rapidly with increasing levels of spherulitic crystallinity (see S. A. Jabarin, Polymer Engineering & Science, vol. 22, 815 (1982)), so that even with 3% crystallinity the haze is visible to the human eye. Qualitatively, the amorphous films suitable for the process of the invention are clear to the eye. Haze is expressed as the percentage of the total transmitted light that after passing a film sample is scattered by more than 2.5° (see ASTM D-1003-97). Suitable amorphous films for making the stress-whitened films preferably have haze levels less than about 2%.

The density of a polyester article is very sensitive to presence of crystalline material and thus a good measure of degree of crystallinity. The literature value for the density of amorphous PET is $\rho_a$=1333 kg/m³ (see J. Brandrup & E. H. Immergut, Polymer Handbook, 2$^{nd}$ Edition, Wiley-Interscience, 1975). For 100% crystalline PET, the most commonly used reference density is $\rho_c$=1455 kg/m³ (see P. Daubeny, C. W. Bunn and C. J. Brown, Proceedings of the Royal Society, A226, 531 (1954)). However, several authors have reported on experimental samples with densities higher than this reference value. Thus, another reference value for 100% crystalline PET is $\rho_c$=1515 kg/m³ (see S. Fakirov, E. W. Fischer and G. F. Scmidt, Die Makromolekulaire Chemie, 176, 2459 (1975). Bashir et al. have discussed the reference values for 100% crystalline PET and the effect it has on the calculated crystallinity, see Polymer Engineering and Science, 40, 2442 (2000). Densities are generally measured using calibrated density gradient columns.

The process for making stress-whitened PET strips comprises a step of rapidly heating the amorphous film to the drawing temperature. The inventors have found that it is essential the amorphous film be rapidly heated to the desired drawing temperature to result in a stable process, wherein drawing takes place with necking. Rapid heating can be induced with various technologies known to a skilled person, for example with infrared heaters, or by immersing the amorphous film in a liquid heating bath heated to the desired drawing temperature, and also performing the drawing in the machine direction in this bath. The temperature of a liquid bath can be very accurately controlled (to about 0.5° C.), and ensures good heat transfer to the film. Suitable liquids for use in the heating bath (inert to the polyester) are known to a skilled person liquid. Examples of a suitable liquid include water, or water/glycerol mixtures.

The drawing temperature in this process is in the range from $T_g$ to $(T_g+50)°$ C. In principle, drawing could also be performed at lower temperature, but then the drawing rate will be too low for practical and economic application. At a temperature of more than 50° C. above $T_g$ thermal (or cold) crystallisation may start to interfere with the desired orientation-induced crystallisation, reducing drawability. Therefore, the drawing temperature is preferably below $(T_g+40)°$ C.; more preferably below $(T_g+30)$, $(T_g+25)$ or even below $(T_g+20)°$ C. Preferably, the drawing temperature is above about $(T_g+5)°$ C. to allow faster drawing than can be achieved at temperatures below Tg; more preferably the drawing temperature is above $(T_g+10)°$ C. For PET homopolymer, the preferred temperature range is from about 75 to about 105° C., more preferably 80-100, or 85-95° C.

Preferably, the drawing temperature is controlled to a constant value to ensure stable operation; the bath temperature is for example controlled within a range of ±1.0 or ±0.5° C. around a set value.

The amorphous film made from the PET composition is rapidly heated to the desired drawing temperature while applying a draw ratio (λ) close to the maximum draw ratio in longitudinal direction to form an oriented film showing stress-whitening. It was found that at a certain set of conditions and by steadily increasing draw ratio, there is a certain draw ratio at which a transfer from a transparent product to an opaque and whitened product, called stress-whitening, reproducibly and uniformly occurs, which is referred to as $\lambda_{initiation}$. Such onset of stress whitening can be easily visually recognised as the film starts to show silvery streaks and patches; and upon carefully further increasing draw ratio stress whitening becomes uniform across the width of the film. The maximum draw ratio ($\lambda_{max}$) is defined herein as the draw ratio at which failure (breakage) of the stress whitened film occurs on a regular basis. The inventors thus surprisingly found that, depending on for example the type of polyester, drawing temperature and draw rate (or production speed, that is the speed of the take-up rolls), stress-whitening occurs upon drawing within a relatively narrow range of draw ratios in the range from $\lambda_{initiation}$ to $\lambda_{max}$. In order to obtain a stable process, the applied draw ratio is preferably at most ($\lambda_{max}$–a), wherein a is about 0.05; 0.1; 0.15; 0.20; 0.25; 0.30; 0.35; 0.40; 0.45; 0.50; or 1. The applied draw ratio is preferably at least ($\lambda_{initiation}$+b), wherein b is about 0.05; 0.1; 0.15; 0.20; 0.25; 0.30; 0.35; 0.40; 0.45; 0.50; or 1.

Upon applying said draw ratio a whitening of the film occurs; microscopic investigations learned that the film thus obtained contains small voids that are mainly in its interior, whereas the outer surface layers appear to be essentially non-porous. Without wishing to be bound to any theory, the inventors suppose this non-porous surface is the reason that the oriented film has a glossy, lustrous surface appearance; much like transparent oriented PET films. There are at least three interacting variables that control stress-whitening: draw ratio, temperature and drawing speed. The inventors found that conditions that lead to high stress in the film result in stress-whitening; meaning that typically conditions of relatively high draw ratio, low temperature, and high deformation rate are preferred.

As indicated above, the processing window wherein the stress-whitening effect occurs in a controlled and stable process is rather narrow. Preferably, also the applied draw ratio is therefore kept constant. Drawing is generally effected by guiding the amorphous film first over a set of feed rollers and then over a set of draw rollers operated at higher speed, with heating of the film. In order to control variations in draw ratio, preferably drawing is effected with feed and draw rollers the speed of which can be controlled in such way that speed fluctuations of at most about 1% occur, more preferably speed fluctuations are at most about 0.7, 0.5, or 0.3%. Further, the film thickness should be as uniform as possible; in this regard, it is preferred to draw a film after trimming the edges.

Drawing rate (speed) should be sufficient to create stress in the film to initiate stress-whitening. Because drawing resulting in stress-whitening typically occurs with necking, local strain rates may thus be considerably higher than applied drawing speed. Drawing rate (take-up speed of the drawing rollers) is generally at least about 1 m/min, preferably at least about 2, 3, 4, 5, 10, 15, 20, 50, 100 m/min. Too high a drawing rate may induce breakage, but actual values are dependent on actual film dimension and processing conditions, control of thereof, and on polyester composition. Good results have been obtained with drawing speed in the range of from about 5 to 20 m/min, but higher rates of up to about 600, 550, 500, 350, 250 or 200 m/min are considered to be feasible in practice.

The process of the invention may further comprise subsequent to longitudinal drawing, a step of applying a draw ratio in the transverse direction at elevated temperature to form a bi-axially oriented, opaque film. The draw ratio to be applied is not particularly critical, and may vary from about 2 to about 5, depending on the polyester composition and desired film. This second is transverse drawing step, perpendicular to the machine direction, is typically performed using a so-called tenter frame and an oven; drawing temperature is in the same range as the first drawing step.

Conventional, transparent bi-axially oriented PET film can also be made with simultaneous drawing in two perpendicular directions; but such simultaneous bi-axial drawing is found to be less suited than the above described sequential process for making opaque oriented polyester film. The stress whitened bi-axially oriented film can subsequently be slit into tapes. However, for making FIBCs, it is generally sufficient to apply wovens made from uniaxially drawn tapes.

The process for making a stress-whitened opaque film from a PET composition also comprises a step of heat-setting the oriented film. If the opaque film is not heat set, it may form ripples (or a wavy structure) with time. The step of heat-setting can be performed off-line but is preferably done in-line, using equipment and applying conditions as known to a skilled person. Typically, the temperature for heat-setting is in the range of about 150-250° C., a small draw ratio is generally applied to prevent relaxation effects. Once heat-set, the PET film is stable and does not form ripples.

After heat-setting, the opaque film or strips can be wound up into rolls in a usual manner. The film may further be subjected to one or more additional steps to establish other desired properties; like a chemical treatment step, or a coating step.

In a preferred embodiment, the stress-whitened PET strips have been obtained with a process comprising the steps of
  a) extruding a composition substantially consisting of polyethylene terephthalate through a slot die, and quenching to form an amorphous film having a crystallinity of less than 3%;
  b) rapidly heating the amorphous film to a drawing temperature in the range 80-95° C. by immersing the film in a liquid heating bath, while applying a draw ratio in the range of from $\lambda_{initiation}$ to $\lambda_{max.}$ in longitudinal direction using sets of feed and draw rollers the speed of which can be controlled in such way that speed fluctuations of at most about 1% occur, and a drawing rate of at least 1 m/min, to form an oriented film showing stress-whitening, wherein $\lambda_{initiation}$ is the draw ratio at which a transfer from a transparent product to a stress-whitened product occurs and $\lambda_{max}$ is the draw ratio at which failure of the stress whitened film occurs;
  c) heat-setting the oriented film in the range of about 150-250° C.

The opaque PET strips used in the FIBC according to the invention have such a dimension that a desired balance between strength and flexibility is obtained. Thickness can vary widely, but is usually in the range of from 5 to 1000 µm, preferably 10-500 µm, more preferably 15-200 or 20-100 µm; and their width may vary from 0.5 mm to 50 mm, preferably 1-25 mm, more preferably 2-10 mm.

The PET strips can be made into a flexible woven fabric using techniques known to a skilled person. Any type of woven can be used, but preferably a plain weave is used to make the fabric from which the FIBC body is to made. A plain weave is also referred to as tabby weave or one-up-one-down weave; and is the most basic type of woven, wherein warp and weft strips are aligned so that they form a simple criss-cross pattern. More preferably, the flexible woven fabric is of a balanced plain weave; meaning that the warp and weft strips are of the same size and mass.

The woven fabric made from the opaque PET tapes typically has an areal density or areal mass from 25-500 g/m$^2$, preferably 30-150 g/m$^2$, and more preferably 50-100 g/m$^2$.

The FIBC according to the invention has a body that can be made from a flat or from a tubular woven fabric made from opaque PET strips, applying known techniques of weaving. Various methods are known to a skilled person to make a FIBC from woven fabrics, as for example described in GB 1591091 and US 2004/0058604 A1, and the same accounts for the integral handling devices.

The body of the FIBC according to the invention is made from a woven fabric of opaque strips made from polyethylene terephthalate, which strips have a density of 500-1300 kg/m$^3$, preferably in the range 600-1200 or 600-1100 kg/m$^3$, Conventional, transparent PET strips have a density of about 1400 kg/m$^3$ depending on the crystallinity of the strip. Because of this relatively high density, compared with for example the density of polypropylene of about 900 kg/m$^3$ the price for PET products expressed on a mass base is also relatively high, and may prevent commercial application. In this respect, a FIBC made from fabric of opaque PET strips having a density of at most 1300 kg/m$^3$ and still having a high tensile strength shows an advantageous combination of properties.

The body of the FIBC according to the invention is made from a woven of opaque (stress-whitened) PET strips having a tensile strength of at least 250 MPa. It is the combination of PET strips having low density, high gloss, opaqueness, good tensile properties, and also good creep resistance that provides the FIBC with a unique combination of properties. An advantage of low density and high strength allows further reduction in thickness of the woven, and mass of the FIBC. For this reason, the tensile strength of the strips is preferably at least 300, or even 325 or 350 MPa.

The invention will be further elucidated with reference to the following experiments.

Methods

Density

Density of a film sample was measured in a density gradient column. Because of the wide range two columns were used: one column set up for the density range of conventional PET (1330 kg/m$^3$ to 1445 kg/m$^3$), and a second column set up for polypropylene (880-970 kg/m$^3$).

The percentage crystallinity $X_c$ was computed from density measurement with the equation:

$$Xc_\square = \left(\frac{\rho_c}{\rho_{sample}}\right) \cdot \frac{(\rho_{sample} - \rho_a)}{(\rho_c - \rho_a)} \times 100$$

wherein $\rho_c$=1455 kg/m$^3$ for 100% crystalline PET, and $\rho_a$=1333 kg/m$^3$ is the density of amorphous PET.
Typically, for a cast amorphous film $\rho_{sample}$ was between 1333 to 1335 kg/m$^3$; which translates to 0-1.8% crystallinity.

Glass Transition Temperature

The glass transition temperature $T_g$ was measured on amorphous film, using a Differential Scanning Calorimeter with heating rate 10° C./min. The midpoint of the step-like change in heat capacity was taken as the $T_g$. For PET homopolymer and copolymers with low levels of comonomer (<2 mol %), the $T_g$ was found to be about 75° C.

Intrinsic Viscosity

I.V. was measured on a dilute solution of a polyester sample in a 3:2 mixture of phenol-1,2 dichlorobenzene solution, at 25° C. (single measurement). The I.V. was calculated from the measurement of relative viscosity $\eta_r$ for a single polymer concentration (c=0.5%) by using the Billmeyer equation I.V.=[η]=0.25($\eta_r$-1+3 ln $\eta_r$)/c Tensile Properties Tensile stress-strain curves were obtained by drawing a film or tape sample at room temperature in a tensile testing machine at a draw speed corresponding to an initial strain rate of approximately 10$^{-3}$ s$^{-1}$. The modulus was recorded as the initial slope of the stress strain curve up to a strain of 0.2%.

Gloss

For instrumentally measuring gloss of films a certain minimum surface is needed; the relatively small tapes made by extruding from a slot die of 4 mm width are not wide enough to measure gloss. Hence, measurements were performed on plain woven fabric made from strips, at 60° and 45° angle.

Ink Printing

Ink printing was carried out on fabrics with a standard digital printer, as well as with a silk screen printing system. No surface treatments, and standard inks were applied. Adhesion of the ink on the fabric was tested after drying by sticking adhesive tape onto the printed area and removing it again (good adhesion meaning printing would not peel off).

Bag Making

Tapes were made into a plain woven fabric, using standard weaving equipment also applied for making wovens from PP tape.

The fabrics obtained were suitably folded and then the edges were sewn with a standard textile fabric sewing machine, to create a sack or envelope.

Tape Making

COMPARATIVE EXPERIMENTS A

A PET homopolymer, i.e. based on ethylene glycol and purified terephthalic acid as monomers was first dried at 175° C. during about 5 hours in a vacuum oven. The polymer was extruded with a single screw extruder using standard temperature settings through a slot die onto a chilled roll of temperature of about 25° C. A film of 4 mm width and 200 μm thickness was generally made, which film was quenched on a chill roller. The transparent amorphous film, which had an I.V. of 0.70 dL/g and a crystallinity of <1%, had slightly curved edges when viewed in a microscope. This film/tape was too narrow for slitting and trimming thickened edges. The tape was subsequently heated by passing over the curved surface of a hot shoe heated to about 90° C., by using a set of 5 feed and a set of 7 draw rollers. Initially the speed of the draw rollers was set to result in a draw ratio of 3.0; resulting in a transparent stretched film, which was subsequently heat-set under tension by passing through an air oven heated to 170° C. with take-up rollers running 3% faster than feed speed of the oriented film.

The draw ratio was defined as the ratio of the two roller speeds i.e.

$$\text{Draw ratio} = \frac{\text{Draw roller speed}}{\text{feed roller speed}}.$$

The diameters of the feed and draw rollers being the same, this corresponds to the draw ratio imposed in the machine direction i.e. the nominal draw ratio. This may include some elastic strain that is recovered when the fibre/tape is removed from the rollers, consequently the actual draw ratio may be slightly less than the values recorded.

After the process had run stably during at least about 5 minutes, the draw ratio was increased step-wise to 5.0. Further increasing the draw ratio resulted in breakage of the film. It was observed, however, that during a very short time a milky white film was made. Additional tests led to the conclusion that no stable production of such white film was possible with this experimental set up; although variables like temperature of the hot shoe and drawing speed appeared to have some influence.

COMPARATIVE EXPERIMENTS B AND EXAMPLE 1

Tests as described for Comparative experiments A were repeated, but now the amorphous film was passed through a water bath between the feed and draw rollers. In this series of experiments the temperature of the water bath was controlled at 82.0° C. Starting with a feed roller speed of 1.19 m/min, the speed of the draw rollers was gradually increased. The speed of the rollers showed a standard deviation of about 2%.

The amorphous film had an I.V. of 0.71 dL/g and a crystallinity of <1%. Stable production of transparent film was possible up to a draw ratio of about 4.9. In Table 1 some properties are presented for a film made at λ=4.0 (CE B).

Upon further increasing the speed of the draw rollers at said constant feed roller speed, a transition was observed from a transparent into a glossy white film at around λ=5.1 (initiation). At draw ratios of about 5.2-5.7 opaque film could be made during prolonged times and full bobbins could be wound up, but at λ=6.0 film breakage occurred within 5 minutes, and no stable production appeared possible anymore.

In FIG. 1 the results of several series of experiments are summarized, by showing the draw ratios at which (first) stress-whitening and film failure is observed for different combinations of roller speeds (at 82° C.). There thus appears to be a narrow, defined processing window in which a glossy opaque PET film can be produced in stable and reproducible manner.

Opacity or haze was assessed qualitatively: if transparent PET tape was placed on a manuscript the typed letters could be seen and read easily, but for the opaque film/tape samples the writing could hardly be seen/read.

In Table 1 some properties of an opaque film made with λ=5.2 are presented (after heat-setting). The opaque film of Example 1 floated in water, but when placed in a density gradient column spanning the range to 970 kg/m³, it sank to the bottom. Thus, the actual density must lie above 970 but below 1000 kg/m³.

In Table 1 also some data for a commercial uniaxially drawn polypropylene (PP) film is presented for comparison. It is clear that the opaque polyester film shows much better mechanical properties than PP, and even somewhat higher strength than conventional transparent PET film.

TABLE 1

| experiment | tape description | density (kg/m³) | modulus (MPa) | strength (MPa) | elongation at break (%) |
|---|---|---|---|---|---|
| | | | tensile properties | | |
| CE B | transparent PET | 1400 | 9.9 | 356 | 24 |
| Example 1 | white, opaque PET | 970-999 | 10.0 | 398 | 12 |
| | uniaxial PP | 912 | 2.83 | 219 | 9 |

COMPARATIVE EXPERIMENTS C AND EXAMPLE 2

Figure 2:
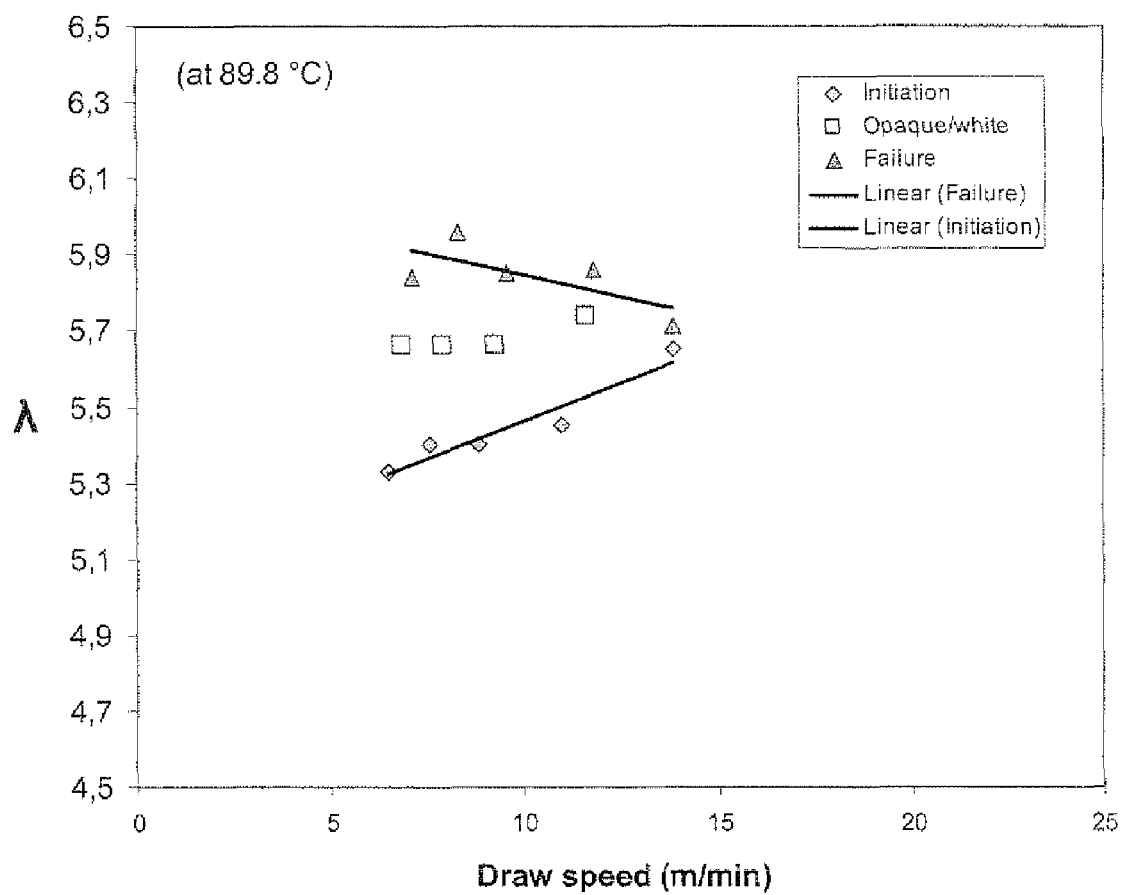
FIG. 2 is a graphical illustration of draw ratio ($\lambda$) versus draw speed for other examples.

The experiments as described for Comparative experiments B and Example 1 were repeated, but now the water bath was controlled at 89.8° C. Again, clear regimes were identified wherein either transparent films (CE C) can be made, or wherein stable production of opaque is possible, be it that the window for making opaque films of Example 2 appears somewhat narrower than at 82° C. drawing temperature. This is further illustrated by the data compiled in FIG. 2.

Fabric and Bag Making

From the opaque PET tapes thus obtained, woven fabrics were made, which had an attractive, glossy, white appearance. Further, the fabric of areal mass 85 g/m³ had a light feel and good drape properties.

The commercial PP woven tape fabric had an areal mass of 86 g/m³; and a dull white appearance.

Woven sacks made from the three types of fabrics were filled with white, crystalline PET chips. With the transparent fabric made from conventionally oriented PET tapes, the chips could be clearly seen. With the PP sack, the fill level could be seen when held against the light, but the nature of the material could not be determined. With the sack made from the stress-whitened PET tapes, the nature of the material could not be determined, and even the fill level could be hardly discerned when held against the light.

In Table 2 gloss and opacity information measured directly on woven fabrics of the three types is presented: a commercial PP tape fabric as used for big bag production; transparent fabric from conventionally, oriented PET tapes of Comparative experiment B; and opaque fabric made from stress-whitened PET tapes of Example 1.

Direct gloss measurement on woven fabric is not ideal, because the surface of the woven fabric is not perfectly flat; but even if the absolute values are not correct, the relative values (which were reproducible) show that the fabric made from stress-whitened PET tapes give the best combination of opacity and gloss. This same rating was also evident by simple visual evaluation. In a bag made from conventional transparent PET tapes the contents would be more exposed to light, while a PP fabric or bag lacks attractiveness because of its low gloss.

Ink printing trials on the fabrics showed that the tape fabrics made from is the stress-whitened PET tapes showed good wetting and adhesion of the ink, without any surface treatment. The printing gave excellent contrast with the fabric background. The transparent fabric from the conventionally oriented PET tapes also showed good wetting and adhesion of the ink, but the visibility of the printing (contrast) depended on what was placed behind the fabric; it was poor in case of dark coloured backing material or packaged content.

The PP tape fabric could not be ink-printed without a corona pre-treatment.

Further, the PET woven tape fabrics were folded and sewn into a sack. Both types of fabric (conventional and stress-whitened) could be sewn without problem.

TABLE 2

| | Woven tape fabric | Gloss at 60° | Gloss at 45° | Fabric appearance |
|---|---|---|---|---|
| | Polypropylene tape | 7.6 | 10.3 | translucent |
| CE B | Transparent PET tape | 42.2 | 45.2 | transparent |
| Example 1 | Stress-whitened PET tape | 36.9 | 40.2 | opaque |

It is further remarked that for having the widest operating window during tape making, and having the best product properties (highest gloss and opacity), the tapes should have perfectly rectangular cross-section, and no edge curvature. It is noted that in the above experiments tapes were extruded from a slot die with similar dimensions as the tape, resulting in some thickening and curving of the edges and a cross-section that was not perfectly rectangular. This can lead to a sample prematurely reaching the breaking draw ratio, and also its gloss is reduced. The best practice would be to cast a wide amorphous PET film, slit and discard about 2 cm strips from both edges, and then slit the remainder of the film into tapes of desired width. The present experimental facilities did not allow for such experimental set-up. The skilled man will appreciate that by following a procedure as described in Examples 1 and 2, faster operation may be anticipated as conditions like draw ratios can be applied more uniformly, and also product properties, including gloss, would be better.

The invention claimed is:
1. A Flexible Intermediate Bulk Container (FIBC) comprising a body made of flexible fabric woven from polymeric strips, and integral handling devices, wherein the fabric is woven from opaque oriented polyethylene terephthalate

(PET) strips having a density of from 500 to 1300 kg/m³ and a tensile strength of at least 250 MPa.

2. The FIBC according to claim 1, wherein the PET contains at most 6 mol % of comonomer.

3. The FIBC according to claim 1, wherein the PET strips have been made with a process comprising the steps of
   a) extruding a composition substantially consisting of PET and at most 10 mass % of customary additives through a slot die, and quenching to form a substantially amorphous film having a crystallinity of at most 5%;
   b) rapidly heating the amorphous film to a drawing temperature in the range from $T_g$ to $(T_g+50)°$ C. while applying a draw ratio in the range of from $\lambda_{initiation}$ to $\lambda_{max}$ in longitudinal direction, and a drawing rate of at least 1 m/min to form an oriented film showing stress-whitening, wherein $\lambda_{initiation}$ is the draw ratio at which a transfer from a transparent product to a stress-whitened product occurs and $\lambda_{max}$ is the draw ratio at which failure of the stress whitened film occurs;
   c) heat-setting the oriented film;
   d) optionally slitting the film into strips after step a), b) or c).

4. The FIBC according to claim 1, wherein the amorphous film has less than 3% crystallinity.

5. The FIBC according to claim 1, wherein heating is performed by immersing the amorphous film in a liquid heating bath.

6. The FIBC according to claim 1, wherein the drawing rate is up to about 600 m/min.

7. The FIBC according to claim 1, wherein the drawing temperature is from (Tg+5) to (Tg+30)° C.

8. The FIBC according to claim 1, wherein drawing is effected with feed and draw rollers the speed of which can be controlled in such way that speed fluctuations of at most about 1% occur.

9. The FIBC according to claim 1, wherein the fabric has an areal mass of 30-150 g/m².

10. The FIBC according to claim 1, wherein the strips have a density of 600-1100 kg/m³.

11. The FIBC according to claim 1, wherein the tensile strength of the strips is at least 300 MPa.

\* \* \* \* \*